United States Patent
Schabert

[11] 3,930,371
[45] Jan. 6, 1976

[54] NUCLEAR POWER PLANT

[75] Inventor: Hans-Peter Schabert, Erlangen, Germany

[73] Assignee: Siemens Aktiengesellschaft, Munich, Germany

[22] Filed: Sept. 6, 1973

[21] Appl. No.: 394,870

[30] Foreign Application Priority Data
Sept. 11, 1972 Germany.............................. 2244549

[52] U.S. Cl. ........................ 60/644; 60/679; 60/680
[51] Int. Cl. ................................................ F01k 7/22
[58] Field of Search ....... 60/679, 680, 644; 122/483

[56] References Cited
UNITED STATES PATENTS

| | | | |
|---|---|---|---|
| 1,745,964 | 2/1930 | Uhde | 60/680 |
| 1,780,226 | 11/1930 | Elsner | 60/679 |
| 3,105,357 | 10/1963 | Vogler | 60/679 X |

Primary Examiner—Martin P. Schwadron
Assistant Examiner—Allen M. Ostrager
Attorney, Agent, or Firm—Kenyon & Kenyon Reilly Carr & Chapin

[57] ABSTRACT

A nuclear power plant includes a steam generator supplied via an input inlet with feed water heated by reactor coolant to generate steam, the steam being conducted to a steam engine having a high pressure stage to which the steam is supplied, and which exhausts the steam through a reheater to a low pressure stage. The reheater is a heat exchanger requiring a supply of hot fluid. To avoid the extra load that would be placed on the steam generator by using a portion of its steam output as such heating fluid, a portion of the water in the steam generator is removed and passed through the reheater, this water having received at least adequate heating in the steam generator to make the reheater effective, but not at the time of its removal being in a boiling condition.

7 Claims, 4 Drawing Figures

NUCLEAR POWER PLANT

BACKGROUND OF THE INVENTION

This invention relates to a nuclear power plant, the reactor being of the pressurized-water coolant type and its coolant being circulated through a steam generator having a feed water inlet and in which the feed water generates steam which is used to power a steam engine, such as a turbine, having a low pressure stage and a high pressure stage, the mechanical rotary power produced by the turbine driving a generator producing electric power, for example.

The steam generator is in the form of a vertical cylindrical casing containing a horizontal circular tube sheet in which the ends of the vertical legs of an inverted U-shaped nest of heat exchanging tubes are mounted, the casing below this tube sheet being constructed to form a coolant inlet manifold for the inlet end of the tube nest, and a coolant outlet manifold for the outlet end of the next. The manifolds are in circuit with the coolant circuit of the reactor, the coolant passing through the tube nest. The casing extends above the tube sheet and its upper portion is provided with a steam outlet, a feed water inlet supplying feed water to the casing above the tube sheet and which vaporizes and generates steam. The feed water must be pumped into the casing against the steam pressure by one or more feed water pumps and the feed water is introduced to the water already in the casing, through a feed water reheater inside of the casing and receiving heat from the outlet leg of the tube nest. Above the tube nest the steam generator's casing contains at least one water separator for removing water from the generated steam before leaving the steam generator, and possibly a coarse water separator followed by a fine water separator.

The steam from the steam generator goes to the high pressure stage of a turbine, the exhaust from there then going through a reheater and to a low pressure stage of the turbine, the exhaust of which is handled in a normal manner.

The above steam reheater is a heat exchanger of the counter flow type requiring a supply of hot fluid, and this supply has heretofore been steam taken from the output of the steam generator, thus placing on the latter an extra load above that required to power the turbine. When the turbine load changed unstable operation was possible, condensate shock or backup of the steam condensate discharged from the reheater necessitating the reheater being designed as a heat exchanger of larger size when might otherwise have been necessary. Also, the additional load on the steam generator required the latter to be operated at higher capacity, placing undesirable stress on the steam lines and fittings and on the water separators within the steam generator. Because more steam was required than was necessary to power the turbine, more feed water had to be constantly introduced to the steam generator, requiring a larger capacity feed water pump than what otherwise would have been necessary. Using steam as the heating medium for the reheater, the latter had to be provided a condensate cooler for the exhausting steam, a condensate decompressor and other equipment.

Because of the need for additional steam required by the reheater, a larger amount of water was required to be boiled off in the steam generator, leaving undesirable deposits of salts and the like unavoidably included by the feed water. To constantly circulate the water in the steam generator, the latter had to be provided with an annular descent space surrounding the tube nest with its lower end spaced above the tube sheet to provide for thermal circulation, requiring the generator casing to be larger and therefore more expensive.

During start-up and shut-down of the nuclear reactor, a complicated system of multiple emergency feed water pump equipment, emergency feed water lines and deionate supply tanks, were required to remove the residual heat via the steam generator functioning as a heat exchanger.

SUMMARY OF THE INVENTION

An object of the present invention is to eliminate the objectionable features described above and to provide the described type of nuclear power plant with a simpler construction.

According to the invention, the previously described reheater is supplied with heating fluid by removing a portion of the feed water from the steam generator and passing it through the reheater and back to the steam generator. The water is removed from the steam generator after it has been heated adequately but not while it is in a boiling condition containing steam. Solid or dead water is removed from the steam generator after its temperature has been elevated sufficiently. The feed water leaving the reheater may go back to the steam generator by a pump which boosts its pressure but the power required for this purpose is not excessive. In this way the complications of handling steam are eliminated, the entire steam output of the steam generator is available to power the turbine, the size of the steam generator may be reduced, the feed water pumping equipment may be made of smaller capacity and other advantages are obtained as well.

The feed water is removed from the steam generator, when the latter is designed for thermal water circulation, at a location adjacent to the center of the tube sheet so that feed water ordinarily fed from the descent space to the latter radially inwardly over the tube sheet, is effectively maintained at a flow rate reducing its risk of local boiling and causing deposits. In another form of the invention the vertical circulation of the feed water within the steam generator is effected by removing a major amount of the feed water required by the reheater from water collected by the water collector in the steam generator, and a small amount from adjacent to the upper surface of the tube sheet. After passage through the reheater all of the water is returned to the bottom portion of the generator, via its preheater, together with any additional feed water required, thus effecting a forced vertical circulation of the water within the steam generator. This eliminates the need for the shell surrounding the tube nest to provide the descent space required for thermal circulation, permitting the steam generator to be reduced in size, keeping in mind that its size may be inherently reduced because of the reduction in its required output capacity effected by relieving it of the necessity of producing steam for the reheater.

Another feature of the invention is that to remove the residual heat during start-up and shut-down of the reactor via the steam generator, the portion of feed water removed for the reheater may be by-passed around the reheater, sent through a cooling heat exchanger and via a pump, returned to the steam generator, the cooling heat exchanger receiving cooling fluid via the usual nuclear intermediate cooling circuit which must always be in operational readiness for safety reasons. This eliminates the former complicated system of emergency feed water pumps and lines and deionate supply tanks.

DESCRIPTION OF THE DRAWINGS

The invention is illustrated by the accompanying drawings in which.

DETAILED DESCRIPTION OF THE INVENTION

Figure 1:
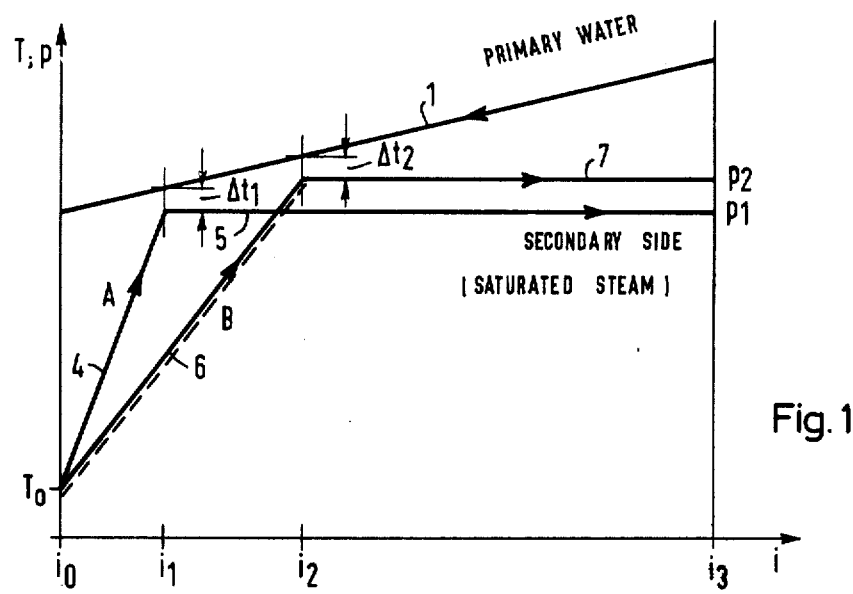
FIG. 1 is a graph showing the temperature and amount of heat prevailing in the steam generator of a pressurized-water coolant nuclear reactor system.

In FIG. 1 the graph shows the temperature and the amount of heat which prevail in the steam generator of a nuclear power plant with a pressurized-water reactor. Line 1 shows the temperature of the primary water which flows through the steam generator. Through heat transfer to the secondary-side feed water, the primary water is cooled down from the input temperature on the right-hand side of the diagram to the output temperature.

Normally, the feed water is preheated from the starting temperature $T_o$ along the line 4 up to the evaporation temperature at the line 5. This evaporation temperature is lower by the temperature difference $\Delta t_1$ than the temperature of the primary water, as the heat transfer requires a certain temperature gradient. According to the invention, however, more heat is expended along the line 6, as part of the preheated feed water serves to heat the superheater. The steam temperature thereby rises to the value indicated by the line 7, where again approximately the same temperature difference $\Delta t_2$ against the primary water prevails.

Figure 2:
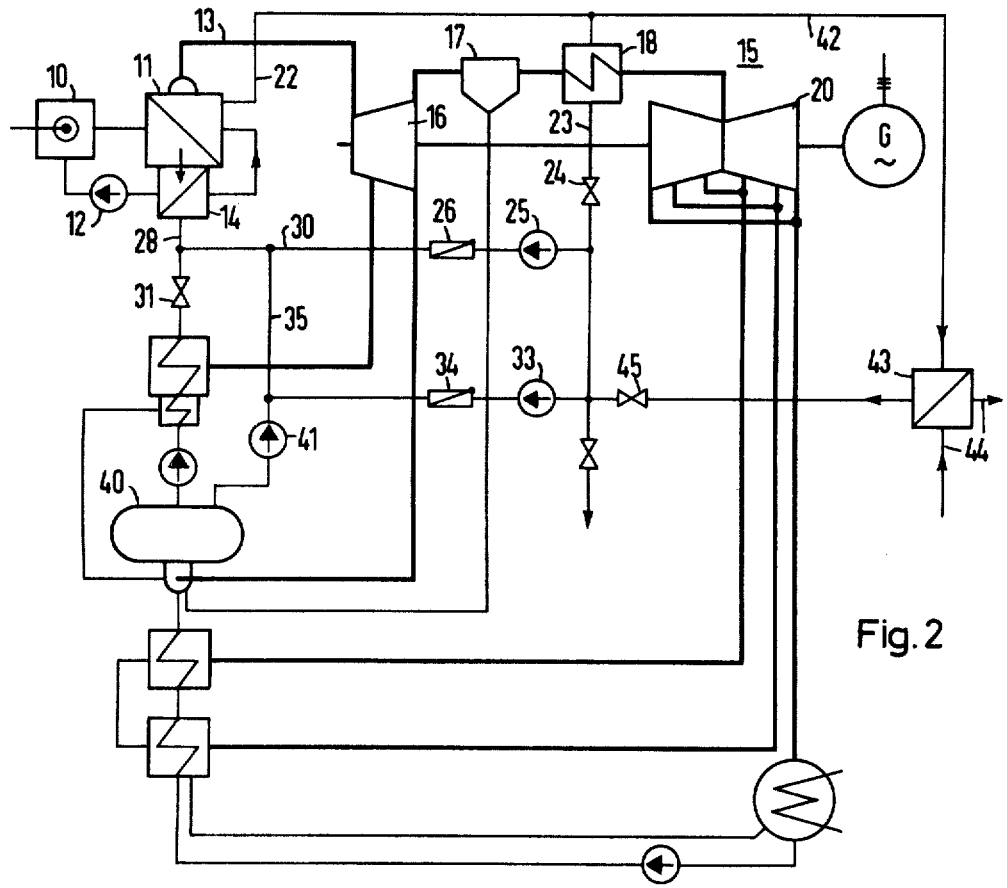
FIG. 2 diagrammatically illustrates a power plant embodying the invention.

Referring to FIG. 2, a pressurized-water coolant reactor 10 is the heat source in this instance, the coolant being circulated through the previously described tube nest of the steam generator 11, later described in detail, and back to the reactor under the force of a coolant pump 12; this is a closed circuit. The steam output of the generator 11 is fed through a line 13 to a two-stage steam turbine 15, the steam going first into the high-pressure stage 16, then through a water separator 17, through the previously described reheater, or reheat-superheater 18, and then to the low presure stage 20 of the turbine 15.

As the heating means for the reheater 18, a line 22 removes the portion of the feed water required by the steam generator 11, from a feed water preheating zone indicated at 14. The details of this are described hereinafter, but for the present it is sufficient to understand that it may be any portion of the feed water in the steam generator 11 which has been heated to temperatures making it effective in the reheater, but which is solid water free from steam, being under the pressure prevailing in the steam generator. The feed water leaves the reheater 18, having given up a substantial portion of its heat to the steam line going to the low pressure stage 20 of the turbine 15, by way of a line 23, valve 24, pressure boosting pump 25, a check valve 26 preventing reverse flow, and line 30 to the feed water line 28 which feeds the input water constantly to the steam generator 11 required for the latter's steam output. If due to a pressure reduction, the feed water has converted to or contains steam in the line 30, the cold feed water in the line 28 condenses such steam back into water. The feed water is supplied to the line 28 under adequate pressure in the usual manner through the usual control valve 31, and it is to be noted that the line 30 connects with the line 28 between the feed water valve 31 and the steam generator. Therefore, the feed water circuit starting at the line 22 and ending at the line 30 and via the line 28 to the steam generator, has only a very small pressure drop. Consequently the circulating pump 25 does not require very much power, its output pressure being less than 15 bar in a typical installation.

To provide for the heat removal required during start-up and shut-down of the reactor 10, and for emergency cooling when needed, the line 22, to by-pass the reheater 18, connects with a line 42 which carries the feed water removed from the steam generator 1, through a cooling heat exchanger 43 and from there through a control valve 45, a pressure boosting pump 33, a reverse flow preventing check valve 34 and so via a line 35, to the line 30 which connects with the feed water line 28. For cooling, the heat exchanger 43 is connected in circuit with the nuclear intermediate cooling circuit 44 which is always in operational readiness, so that this system which with its pump 33 is in parallel with its previously described reheater feed water circuit, is available to provide cold feed water directly to the steam generator when necessary. The valves 24 and 45 are control valves for the two circuits.

With the above parallel circuit, emergency cooling of the reactors pressurized-water coolant, is always available via the steam generator 11. This eliminates the need for the customary equipment used for this purpose and previously described.

Under normal operating conditions the turbine 20 powers an electric generator G. Its preheater 18 is supplied with heating fluid via the circuits including the lines 22, 23 and 30 back to the feed water input line 28.

Neither of the circulating pumps 25 and 33 consume very much power. They are only required to raise the feed water pressure a little above the pressure reduction resulting from passage through either the reheater 18, or the cooling heat exchanger 43 as the case may be. Both circuits concerned, are closed and operate under the steam generator water pressure.

A quantitative estimate of the advantages of the invention is possible by the following Table, in which the reheating with live steam is compared with the reheating according to the invention for the example of a pressurized-water reactor with 650 MWe, at a live-steam pressure of 70 bar with 0.25 percent moisture and a steam-generator entrance temperature (preheating end and water return temperature) of 215°C.

| Reheating by: | | Live Steam | Hot Water |
|---|---|---|---|
| Quantity of steam to turbine | kg/s | 920 | 920 |
| Quantity of steam to reheater | " | 80 | — |
| Quantity of steam to steam drier | " | 1000 | 920 |
| Water removed from steam generator | " | 10 | 430 |
| Water throughput, preheating zone | " | 1010 | 1350 |
| Water throughput, feed pump + high-pressure preheater | " | 1010 | 930 |
| Water throughput, circulating pump | " | — | 420 |
| Water throughput, elutriating decompressor | " | 10 | 10 |
| Input temperature, elutriating decompressor | °C | 284 | 215 |

Figure 3:
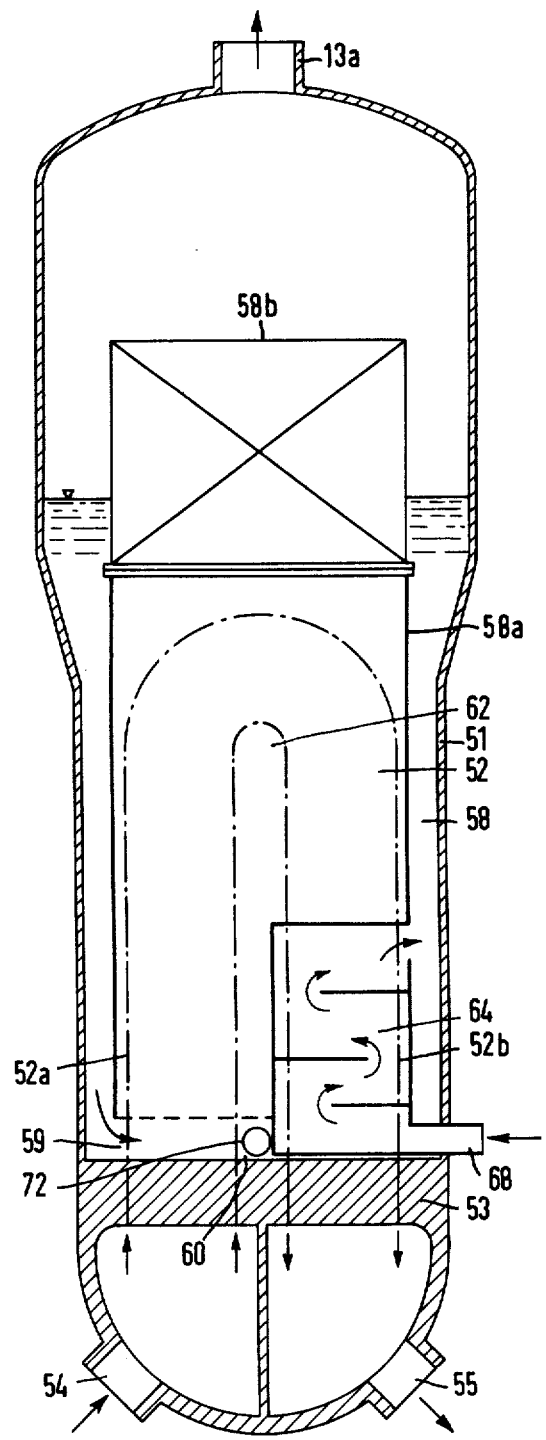
FIG. 3 schematically illustrates in vertical section one type of steam generator previously described.

FIG. 3 shows an example of a typical steam generator which may be used as the steam generator indicated at 11 in FIG. 2.

In this instance, a vertical cylindrical casing 51 encloses the inverted U-shaped nest of tubes 52, indicated by broken lines, through which the reactor coolant is circulated, the vertical legs 52a and 52b of this nest being mounted in a horizontal circular tube sheet 53. The inlet manifold below the tube sheet has a reactor coolant inlet 54, the coolant circulating up through the nest leg 52a and down through the outlet leg 52b to the outlet manifold below the tube sheet 53, and back to the reactor via a coolant outlet 55.

This steam generator normally operates with natural or thermal circulation, the feed water entering via 68 going through a preheater 64 surrounding the outlet leg of the tube nest, and into the descent space 58 formed by the shell 58a which surrounds the tube nest in spaced relationship relative to the casing 51, and having its lower end spaced above the tube sheet 53 to define an annular space 59, the descending feed water feeding radially inwardly over the upper surface of the tube sheet 53 and then upwardly. The feed water rises in the boiling space 62 while evaporating to form steam, the water being separated by a water separator 58b on top of the shell 58a, and the steam leaving via a steam output outlet 13a connecting with the line 13 in FIG. 2. When the reheater 18 of FIG. 2 was supplied with a portion of this output steam, the steam generator had to be large enough to have adequate capacity to meet this extra load, making the steam generator more expensive and placing extra loading on the water separator 58b. Other trouble, previously described, could also occur.

In this instance, the feed water supplied to the reheater 18 is removed from the steam generator via an elutriating outlet 72 which although not specifically shown in FIG. 3, extends to the central portion of the area adjacently above the circular tube sheet 53, thus accelerating or reinforcing the radial inward flow via the annular inlet 59 from the descent space 58 and improving the feed water circulation within the steam generator. It is this outlet 72 that connects with the line 22, and inlet 68 connecting with the line 28, as these lines are shown in FIG. 2. This central portion of the tube sheet 53 is indicated at 60.

The steam generator shown by FIG. 4 again has the inverted U-shaped nest of tubes 52 but in this instance the water circulation is a forced flow. In this instance the casing 51 contains a coarse water separator 74 and a fine water separator 75. The feed water separated from the water-steam mixture in the coarse separator 74, is fed from this steam generator through a line 77 which connects with the line 22 in FIG. 2, while a smaller amount of feed water is removed via a line 78 from an area near the upper surface of the tube sheet but not so close to its center 60 as in the case of the FIG. 3 example. This line 78 connects with the line 77. The line 28 of FIG. 2, connects with the feed water inlet 68 and enters this steam generator via a preheater 64, this preheater also feeding a small portion of the preheater feed water via a line 82 to the water collection portion 83 of the coarse water separator 74 and, being somewhat colder than the water in this portion 83 serving to condense possible steam to assist in maintaining an easily controlable feed water level while preventing steam bubbles from getting into the line 77. The water collection portion 83 of the coarse separator 74 has its periphery affixed to the inside of the casing 61 and connects with the line 77.

Figure 4:
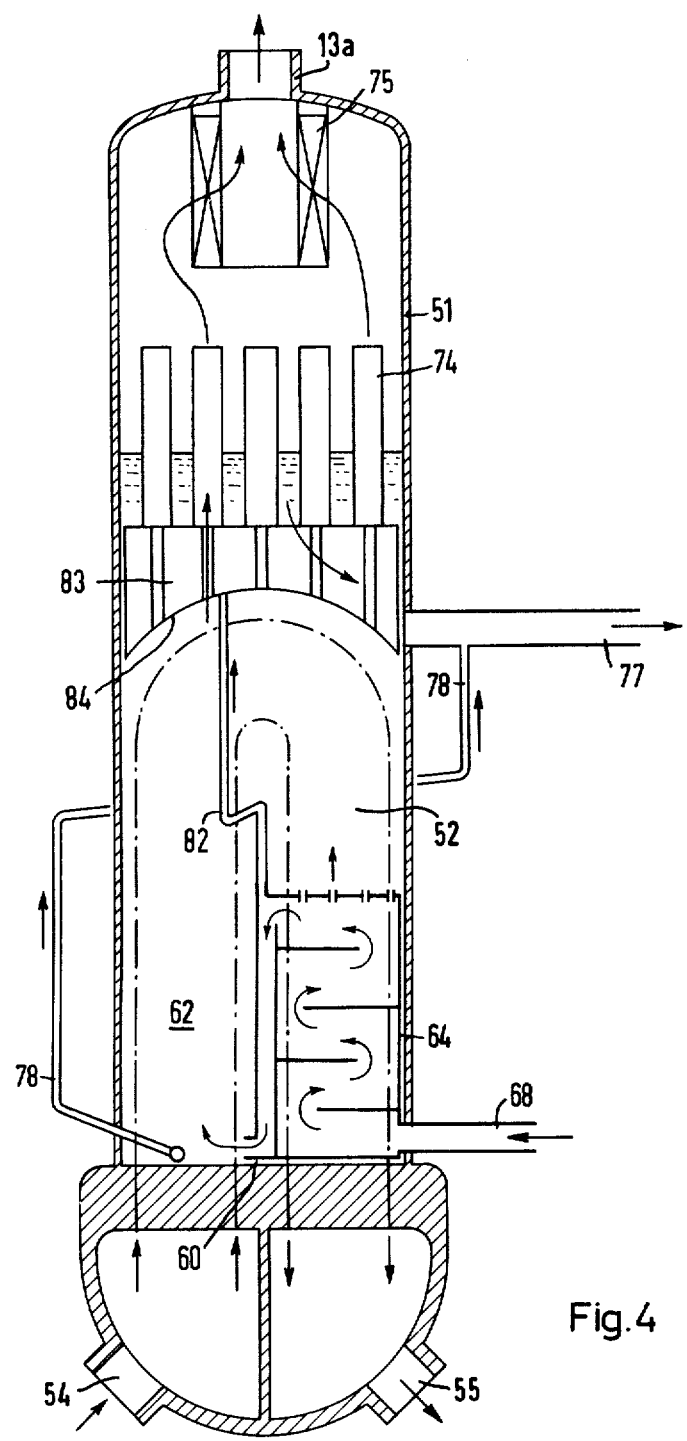
FIG. 4 is the same as FIG. 3 but shows another example.

In the operation of this steam generator of FIG. 4, the outlet 77 supplies solid very hot feed water through the line 77 through the line 22 of FIG. 2, this feed water being above normal boiling temperature because under the pressure of the generated steam. After leaving the reheater 18 and with its pressure raised by the pump 25, the water returns to the steam generator via its feed water inlet 68. Therefore, the water in this steam generator is under forced circulation at all times in the boiling space 62.

However, the circulation through the line 78 is effected thermally, this line being of small capacity relative to the forced circulation and serving fundamentally as a elutriating line.

What is claimed is:

1. A nuclear power plant including a steam generator supplied via an input inlet connecting with a source of feed water under pressure, with feed water which in the generator is heated by reactor coolant until it boils to steam, and a steam engine having a low pressure stage supplied with said steam and exhausting the steam through a reheater to a low pressure stage; wherein the improvement comprises means for conducting said feed water from within said generator to and through said reheater.

2. The plant of claim 1 in which said portion is conducted from the feed water in the generator at a location where the feed water is not boiling.

3. The plant of claim 1 in which said generator contains a horizontal tube sheet mounting an upstanding inverted U-shaped nest of tubes for the reactor coolant and surrounding by a casing, the input feed water being fed to the upper surface of the tube sheet and said means conducting the feed water from an area adjacent to said upper surface.

4. The plant of claim 1 including means for conducting said portion around the reheater and through cooling and pressure increasing means, to said generator's feed water supply inlet.

5. The plant of claim 1 in which said steam generator includes a feed water separator above said tube nest and which collects the feed water separator from the generated steam, said means conducting the feed water from that collected by this water separator.

6. The plant of claim 1 in which said means returns the feed water from said reheater to said heat exchanger's feed water inlet and includes means for forcing the feed water to circulate.

7. The plant of claim 6 in which said steam generator includes a feed water preheater for the feed water supplied via said feed water inlet.

* * * * *